United States Patent [19]
Leitner

[11] 3,923,295
[45] Dec. 2, 1975

[54] SPRING CLAMP FIXABLE IN A CIRCULAR HOLE IN A PLATE OR PANEL

[76] Inventor: Kajetan Leitner, 817 Bad Tolz, am Winacker, Germany

[22] Filed: July 8, 1974

[21] Appl. No.: 486,660

[30] Foreign Application Priority Data
July 16, 1973 Germany............................ 2336184

[52] U.S. Cl.......... 267/158; 301/37 CD; 301/108 R
[51] Int. Cl.²........................................... F16F 11/26
[58] Field of Search............ 267/158; 301/108 R, 37

[56] References Cited
UNITED STATES PATENTS
2,205,653  6/1940  Hunt et al....................... 301/108 R
2,800,368  7/1957  Horn............................... 301/108 R

*Primary Examiner*—James B. Marbert
*Attorney, Agent, or Firm*—O'Brien & Marks

[57] ABSTRACT

A spring clamp fixable in a circular hole in a plate or panel, preferably for securing hub caps to wheels of vehicles.

3 Claims, 6 Drawing Figures

SPRING CLAMP FIXABLE IN A CIRCULAR HOLE IN A PLATE OR PANEL

The object of the invention is to form the spring clamp in such a way that the circular hole is covered by the spring clamp as little as possible.

This object is attained in accordance with the invention by means of a construction of the spring clamp which is characterized by a flat contact fitting applied against the plate or panel and a clamping yoke tending to move away from this substantially at right angles, in which connection for the purpose of avoiding any covering of the circular hold by the fitting there are formed from this latter in the vicinity of the circular hole at least one holding lug and two guide lugs lying opposite one another, substantially axially to the circular hole, the lugs being cut out of the material substantially starting from the vicinity of the circular hole, and the guide lugs forming by their substantially axially extending edges a centreing system for the clamp in relation to the circular hole, while the holding lug is provided with a claw which engages behind the circular hole and presses the fitting against the plate or panel as a result of a resilient arching or curvature in respect of the said plate or panel.

Through the cutting out of the holding iug or lugs and the guide lugs out of the material, essentially originating from the material of the circular hole, there is automatically obtained a corresponding aperture in the fitting, which when the clamp is applied lies over the circular hole. It is further possible in this connection to stamp away out of this zone of material as much more as is necessary for leaving the circular hole free. By this means it is thus avoided having the circular hole covered, so that it remains free for the passage of any further object.

Such a problem exists for example in the case of motor vehicle wheels, whose rims are provided with axially-directed circular holes through which the sensing members for measuring the correct positioning of the rims are inserted. Now if these circular holes are utilized simultaneously for securing hub caps, the spring clamps used for this purpose must be given such a construction that they only cover a very little of the circular hole in the incorporated condition.

Through the guide lugs, which when the clamp is incorporated project into the circular hole, the said clamp automatically receives a centreing in respect of the circular hole. The said guide lugs, that is to say, are applied by their substantially axially extending edges against the inner surface of the circular hole, or lie so closely near this, that the desired centreing is obtained. Through the claw provided at the end of the holding lug there is then effected the fixing of the spring clamp against the plate or panel, the claw engaging behind the circular hole and the fitting of the spring clamp pressing against the plate or panel. The convexity given to the fitting makes it possible for this to approach the plate or panel under spring stress, the convexity or curvature being correspondingly forced through. In this way the resilient curvature ensures that the claw always presses, under tensile stress, against that side of the plate which is remote from the fitting.

Basically, for fixing the spring clamp to the plate one holding lug with a claw is sufficient. It is also possible however to provide two holding lugs, which are then disposed opposite one another and laterally offset in such a way that before they are given their final form they lie partly adjacent to one another. This adjacent position is necessary since the holding lugs have to be given such a length that they can grip by their particular claw concerned through the circular hole. In order to be able to give the holding lugs the requisite length for this purpose, they must lie adjacent to one another in the not-finally-formed condition, so that their length is not restricted by the particular holding lug lying opposite.

It is frequently desirable to hold the object to be held at a certain distance from the fitting of the spring clamp. For this purpose a support lug bearing against the contact fitting is formed out of the clamping yoke and acts as an abutment or counter-bearing for the object to be held. The support lug thus represents to some extent a stop for the object to be held, holding the latter fast at a given distance from the contact fitting.

Some examples of embodiment of the invention are represented in the Figures. In these:

Figure 1:
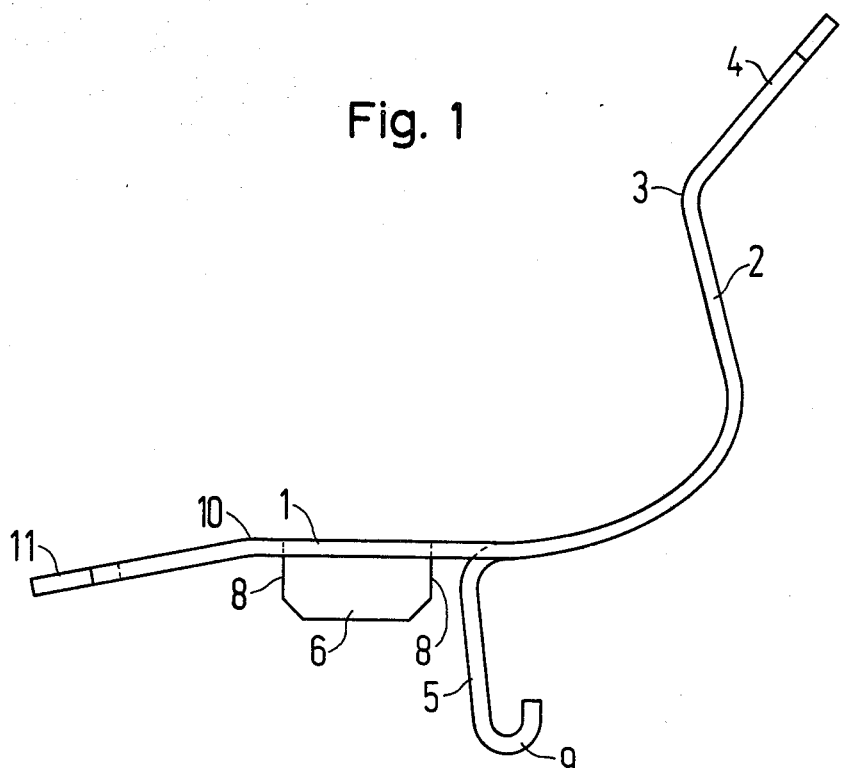
FIG. 1 shows the spring clamp with a holding lug in side elevation.

The spring clamp represented in FIG. 1 consists of the contact fitting 1 and the clamping yoke 2. THe clamping yoke 2 projects substantially at right angles away from the contact fitting 1, extending following a curve or bend 3 in such a way that a component to be held, inserted from above, because of the obliquely outwardly extending bent-over element or flange 4 first of all can press the clamping yoke outwards until the component then slides behind the bend 3 and here catch-engages behind this bend 3, as in this zone the clamping yoke forms a corresponding angle in respect of the flange 4.

The holding lugs 5 and two guide lugs 6 lying opposite one another are formed out of the contact fitting 1, that is to say by cutting them out and bending them round out of a zone of material of the contact fitting 1, substantially originating from the zone of the circular hole.

Figure 2:
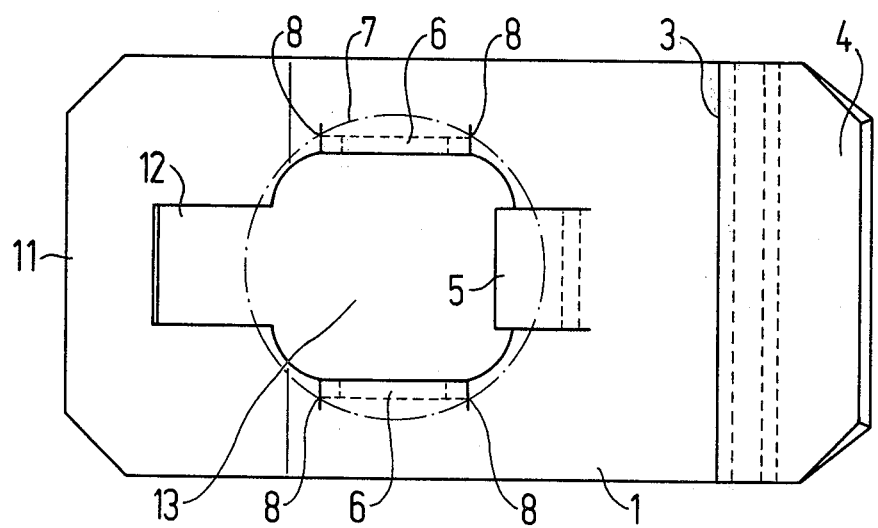
FIG. 2 shows the same spring clamp in plan.

In the plan view shown in FIG. 2 of the spring clamp of FIG. 1, this circular hole 7 is indicated in chain line. As can be seen from FIG. 2 the axially extending edges 8 of the guide lugs 6 are applied against the inner surface of the circular hole 7 so that the spring clamp is centred correctly in relation to the circular hole 7 by the guide lugs 6.

The holding lug 5 has at its end a claw 9 which grips behind the circular hole 7 and presses the contact fitting 1 against a plate or panel, to which the spring clamp is to be fixed. This fixing to a plate is further explained below with reference to FIG. 5. Now to ensure that the contact fitting 1 can be drawn tightly under spring stress against such a plate, the said contact fitting 1 has a curvature 10 which terminates in the arm 11 which then presses in the fixing condition against the surface of the plate in question. The curvature or bend portion 10 is thereby stretched, producing a spring tension which in co-operation with the claw 9 holds the contact fitting 1 against the plate in question.

It can further be seen from FIG. 2 that opposite the holding lugs 5 there is located a recess or cut-away 12, which originates from the cutting-out of the holding lug 5 with the claw 9. Through the cutting-out of the guide lugs 6 and the holding lug 5 there is obtained the aperture 13 in the contact fitting 1, by which the circular hole 7 remains practically completely accessible. During the cutting out of the guide lugs 5 and holding lugs 6 furthermore so much material is additionally punched or stamped away from the contact fitting 1 as is requisite for this accessibility, insofar as this stamping-away is not replaced by the cutting-out and bending-over of the holding lugs 5 and guide lugs 6.

Figure 3:
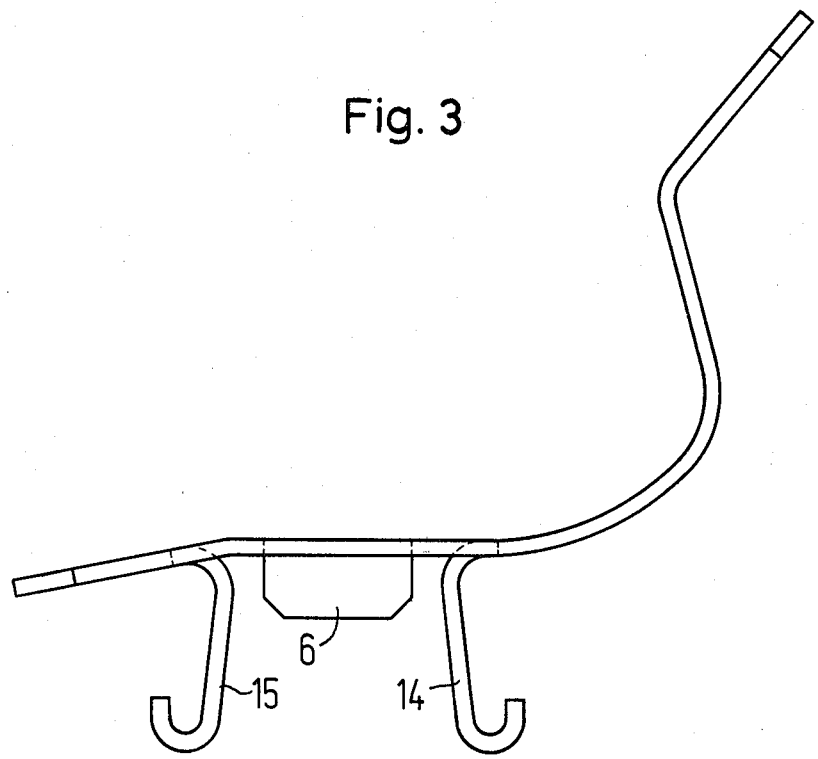
FIG. 3 shows the spring clamp with two holding lugs in side elevation.
Figure 4:
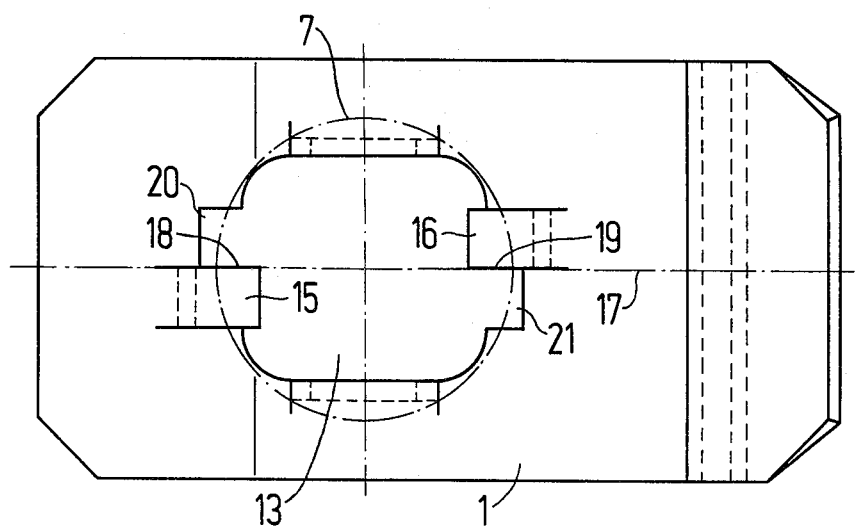
FIG. 4 shows the same spring clamp in plan.

In the example of embodiment represented in FIGS. 3 and 4 the spring clamp has two holding lugs, that is to say the holding lugs 14 and 15. The other elements correspond to the appropriate elements of the spring clamp of FIGS. 1 and 2. The two holding lugs 14 and 15 lie opposite one another and are disposed offset laterally in such a way that in the unformed-out condition they lie partly adjacent to one another. This arrangement of the two holding lugs 15 and 16 can be seen from FIG. 4, the centre line 17 shown here being in alignment with the edges lying opposite one another 18 and 19 of the holding lugs 15 and 16. Opposite each holding lug 15 or 16 respectively there lies a recess 20, 21 in the contact fitting 1, which is obtained through the cutting-out of the particular opposed holding lug 15 or 16. With this spring clamp there can be applied if requisite greater holding force than with the spring clamp of FIGS. 1 and 2.

Figure 5:
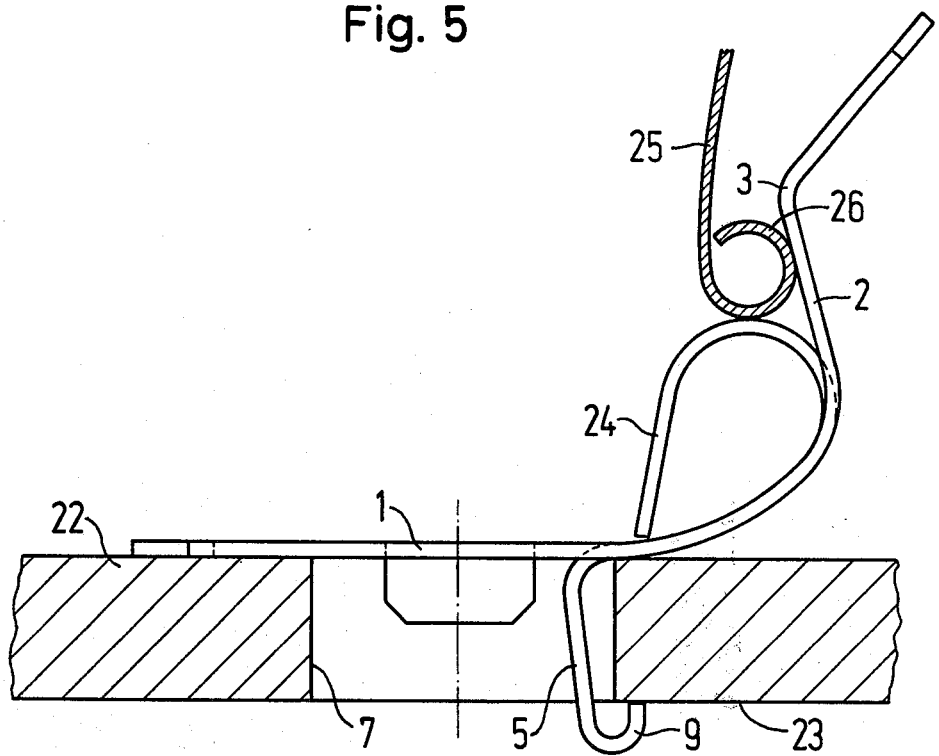
FIG. 5 shows the spring clamp of FIG. 1 together with a plate or panel and an object held by the spring clamp.

FIG. 5 shows, fixed to a plate or panel 22, a spring clamp whose construction in respect of the contact fitting 1 corresponds to that of FIGS. 1 and 2. As can be seen, here the holding lug 5 grips through the circular hole 7 and is applied by its claw 9 against the side 23 of the plate 22 remote from the fitting 1. In this connection the holding lug 5 exerts such a pull on the contact fitting 1 that its curvature (see 10 in FIG. 1) practically disappears and the contact fitting 1 is applied flat against the plate 22. The contact fitting 1 thus stands in co-operation with the holding lug 5 under a spring stress which holds it firmly against the plate 22.

Here the support lug 24 is formed from the clamping yoke 2, that is to say by cutting-out from the centre of the clamping yoke 2. The support lug 24 is then bent round until it abuts against the contact fitting 1, whereby it serves as an abutment or counter-bearing for an object to be held, here the hub cap 25, of which only the part here of interest is represented.

The hub cap 25 has a beading 26 which is slid over the bend 3 and thereupon is catch-engaged between the bend 3 and the support lug 24 as a result of the angular position apparent in FIG. 5 of the clamping yoke 2. The support lug then prevents any further slipping away of the hub cap 25 in the direction of the contact fitting 1. Here the plate 22 is formed by the corresponding part of a rim.

As already represented above, in any case the aperture 13 in the contact fitting 1 above the circular hole 7 remains free, so that even in the assembled condition the circular hole 7 remains accessible and in the event of being used in connection with a wheel rim any instruments for measuring the wheel can be inserted as before through the circular hole 7.

Figure 6:
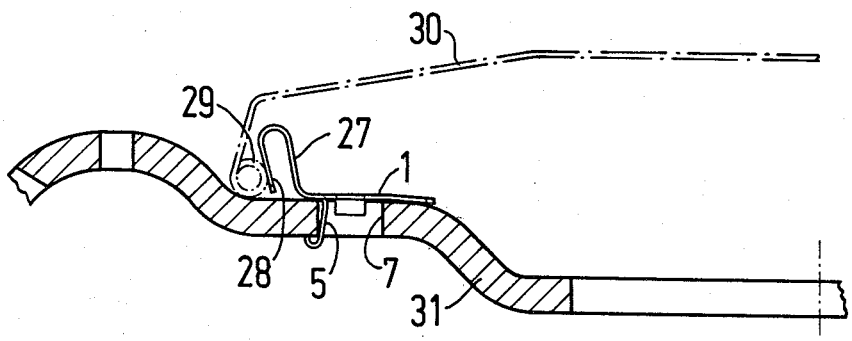
FIG. 6 shows a variant spring clamp applied to the rim of a motor vehicle wheel together with a hub cap held by the spring clamp.

In FIG. 6 is shown another form of embodiment of a spring clamp, whose construction in respect of the parts co-operating with the circular hole 7 corresponds with the form of embodiment of FIG. 1. As regards other details connected with the holding the spring clamp fast, reference is made to the appropriate remarks in connection with FIG. 5. In the case of the embodiment in FIG. 6 the contact fitting 1 develops into a U-shaped clamping yoke 27 behind whose arms 28 the hub cap catch-engages by its rolled-in beading 29. The spring clamp is fixed to the rim 31, that is to say its holding lug 5 projects into circular hole 7 of the rim 31.

The spring clamp described above is preferably stamped out of spring steel, which gives it the requisite spring force.

I claim:

1. A spring clamp fixable in a circular hole in a plate or panel comprising an elongated strip of metal having an attaching contact fitting juxtaposed to said plate or panel over said circular hole, one end of said attaching contact fitting extending substantially at a right angle from said contact fitting away from said plate or panel, the other end of said contact fitting being curved towards said plate or panel, two oppositely-disposed guide lugs having axially extending edges whereby a centering arrangement is formed in relation to said circular hole and at least one holding lug, said guide lugs and holding lug lying intermediate the ends of said attaching contact fitting and extending into said circular hole in said plate or panel, the free end of said holding lug being bent towards said first mentioned end and engaging the inner surface of said plate or panel whereby said clamp is securely gripped by the said attaching contact fitting to secure the same to said plate or panel.

2. A spring clamp as defined in claim 1 having at least two holding lugs, said lugs being oppositely disposed to one another and offset laterally in relation to each other, the free end of one of said holding lugs being bent towards said first mentioned end, the free end of the other of said holding lugs being bent towards the second mentioned end, said free ends engaging the inner surface of said plate or panel whereby said clamp is securely gripped by the said attaching contact fitting to secure the same to said plate or panel.

3. A spring clamp as defined in claim 1 wherein said one end of said attaching contact fitting which extends substantially at a right angle from said contact fitting away from said plate or panel contains a support lug extending outwardly intermediate the ends of said attaching contact fitting and bearing against said attaching contact fitting thereby forming an abutment or counter-bearing for an object to be held.

* * * * *